US012160137B2

(12) United States Patent
Zhang et al.

(10) Patent No.: US 12,160,137 B2
(45) Date of Patent: Dec. 3, 2024

(54) ONLINE INTERACTIVE UNINTERRUPTIBLE POWER SUPPLY AND METHOD FOR CONTROL THEREOF

(71) Applicant: EATON INTELLIGENT POWER LIMITED, Dublin (IE)

(72) Inventors: Huaichao Zhang, Shenzhen (CN); Xiang Zhang, Shenzhen (CN); Songsheng Fang, Guangdong (CN)

(73) Assignee: Eaton Intelligent Power Limited, Dublin (IE)

( * ) Notice: Subject to any disclaimer, the term of this patent is extended or adjusted under 35 U.S.C. 154(b) by 104 days.

(21) Appl. No.: 17/757,796

(22) PCT Filed: Jan. 7, 2021

(86) PCT No.: PCT/CN2021/070610
§ 371 (c)(1),
(2) Date: Jun. 21, 2022

(87) PCT Pub. No.: WO2021/139713
PCT Pub. Date: Jul. 15, 2021

(65) Prior Publication Data
US 2022/0376548 A1      Nov. 24, 2022

(30) Foreign Application Priority Data

Jan. 8, 2020   (CN) .......................... 202010017851.2

(51) Int. Cl.
*H02J 9/06*      (2006.01)
*H02M 1/44*      (2007.01)
(52) U.S. Cl.
CPC .............. *H02J 9/062* (2013.01); *H02M 1/44* (2013.01)

(58) Field of Classification Search
CPC .... H02J 9/062; H02J 7/02; H02J 9/068; H02J 9/061; H02J 2207/20; H02M 1/44
(Continued)

(56) References Cited

U.S. PATENT DOCUMENTS

| 2012/0169141 | A1* | 7/2012 | Divan ..................... H01H 83/10 |
| | | | 307/125 |
| 2015/0155712 | A1 | 6/2015 | Mondal |
| 2021/0159723 | A1* | 5/2021 | Ho .......................... H02J 9/062 |

FOREIGN PATENT DOCUMENTS

| CN | 104810871 | 7/2015 |
| CN | 104953696 | * 9/2015 |

(Continued)

OTHER PUBLICATIONS

International Search Report; PCT/CN2021/070610; Apr. 12, 2021; 2 pages.

(Continued)

*Primary Examiner* — Richard Tan
(74) *Attorney, Agent, or Firm* — Stanek Lemon Crouse & Meeks PA

(57) ABSTRACT

The present invention provides an online interactive uninterruptible power supply and method for control thereof. The online interactive uninterruptible power supply includes: an automatic voltage regulator and a changeover switch which are sequentially connected between an AC input and an AC output; a rectifying circuit, an input of the rectifying circuit being connected to the AC input; a charger, an input of the charger being connected to an output of the rectifying circuit and an output of the charger being configured for connection to a rechargeable battery; a DC-DC converter, an input of the DC-DC converter being connected to the rechargeable battery; and a first inverter, an input of the first inverter being connected to an output of the DC-DC converter. The changeover switch is configured to controllably connect the AC (Continued)

output to one of the automatic voltage regulator and an output of the first inverter. The online interactive uninterruptible power supply of the present invention can realize battery-free AC startup.

14 Claims, 11 Drawing Sheets

(58) Field of Classification Search
USPC .......................................................... 307/66
See application file for complete search history.

(56) References Cited

FOREIGN PATENT DOCUMENTS

| CN | 105337325 | * | 2/2016 |
| CN | 105634108 | * | 6/2016 |

OTHER PUBLICATIONS

Extended European Search Report; EP 21738156.6; Jan. 30, 2024; 8 pages.

* cited by examiner

ONLINE INTERACTIVE UNINTERRUPTIBLE POWER SUPPLY AND METHOD FOR CONTROL THEREOF

CROSS-REFERENCE TO RELATED APPLICATIONS

The present application claims priority to International Application No. PCT/CN2021/070610 filed on Jan. 7, 2021, published as WO2021/139713 entitled as ONLINE INTERACTIVE UNINTERRUPTIBLE POWER SUPPLY AND METHOD FOR CONTROL THEREOF which claims priority to Chinese Application No. 202010017851.2; Filed Jan. 8, 2020, entitled ONLINE INTERACTIVE UNINTERRUPTIBLE POWER SUPPLY AND METHOD FOR CONTROL THEREOF, the disclosures of which are incorporated herein by reference in their entireties.

TECHNICAL FIELD

The present invention relates to an uninterruptible power supply, and in particular to an online interactive uninterruptible power supply and method for control thereof.

BACKGROUND

An online interactive uninterruptible power supply can continuously supply power to a load. When the voltage amplitude of mains power is normal or within an allowable range of the load, the mains power supplies power to the load. However, when the voltage amplitude of the mains power is slightly high or low, an automatic voltage regulator automatically boosts or bucks the voltage of the mains power and supplies power to the load. In addition, when the mains power is cut off or too high in voltage, a rechargeable battery supplies power to the load.

FIG. 1 is a circuit diagram of an online interactive uninterruptible power supply in the existing technology. As shown in FIG. 1, the online interactive uninterruptible power supply 1 includes: a switch S11, an automatic voltage regulator AVR1, a changeover switch S12 and a switch S13 which are sequentially connected between an AC input 111 and an AC output 112; a rechargeable battery 12, a DC-DC converter 13 and a full-bridge inverter 14 which are sequentially connected, and an auxiliary power supply 121 powered by the rechargeable battery 12, where an input of the DC-DC converter 13 is connected to both ends of the rechargeable battery 12 and an output of the DC-DC converter is connected to an input of the full-bridge inverter 14, and the changeover switch S12 controllably connects the AC output 112 to one of the automatic voltage regulator AVR1 and an output of the full-bridge inverter 14; and a full-bridge rectifying circuit 15, a filtering circuit 19 and a charger 16 which are sequentially connected, where an input of the rectifying circuit 15 is connected between the changeover switch S12 and the AC output 112, an output of the rectifying circuit 15 is connected to an input of the filtering circuit 19, an output of the filtering circuit 19 is connected to an input of the charger 16, and an output of the charger 16 is connected to both ends of the rechargeable battery 12.

Those having ordinary skill in the art may know that, in order to clearly show the connection relationship between circuit modules and electronic components of the online interactive uninterruptible power supply 1, a voltage detection device and a control device are not shown in FIG. 1.

Four operating modes of the online interactive uninterruptible power supply 1 will be briefly described below.

Bypass mode: when the mains power has a voltage amplitude greater than a first threshold and less than a second threshold (for example, greater than 200 V and less than 240 V), the auxiliary power supply 121 supplies a required DC voltage (for example, 5 V, 12 V, 24 V, etc.) to the control device with the power supplied by the rechargeable battery 12, to realize the AC startup of the online interactive uninterruptible power supply 1.

FIG. 2 is an equivalent circuit diagram of the online interactive uninterruptible power supply shown in FIG. 1 in a bypass mode. As shown in FIG. 2, the control device controls the switch S11 to be turned on, controls a boost switch S14 and a buck switch S15 of the automatic voltage regulator AVR1 to be connected by a conducting wire and controls a switch S16 to be turned off, controls the changeover switch S12 to connect the automatic voltage regulator AVR1 to the switch S13 and the AC output 112, and controls the switch S13 to be turned on. Therefore, the mains power from the AC input 111 is electrically connected to the AC output 112 by the turned-on switch and the conducting wire, so as to supply power to the load of the AC output 112. The control device simultaneously controls the DC-DC converter 13 and the full-bridge inverter 14 not to operate, and controls the charger 16 to operate to charge the rechargeable battery 12. When the rechargeable battery 12 is fully charged, the charger 16 is controlled to stop operating to stop charging the rechargeable battery 12.

Boost mode: when the voltage amplitude of the mains power is greater than a third threshold but not greater than the first threshold (for example, greater than 160 V but not greater than 200 V), that is, when the voltage of the mains power supplied by the AC input 111 is slightly low, the rechargeable battery 12 supplies power to the auxiliary power supply 121 so as to realize the AC startup of the online interactive uninterruptible power supply 1.

FIG. 3 is an equivalent circuit diagram of the online interactive uninterruptible power supply shown in FIG. 1 in a boost mode. As shown in FIG. 3, the control device controls the switch S11 to be turned on, controls the switch S16 of the automatic voltage regulator AVR1 to be turned on, so as to connect one terminal of a winding to a null line or neutral line, and controls the boost switch S14 and the buck switch S15 of the automatic voltage regulator AVR1 to connect moving contacts of the boost switch S14 and the buck switch S15 to a tap and the other terminal of the winding, respectively. Besides, the control device controls the changeover switch S12 to connect the automatic voltage regulator AVR1 to the switch S13 and the AC output 112, and controls the switch S13 to be turned on. Thus, the automatic voltage regulator AVR1 automatically boosts the mains power from the AC input 111 and then transmits the mains power to the AC output 112. The control device simultaneously controls the DC-DC converter 13 and the full-bridge inverter 14 not to operate, and controls the charger 16 to operate to charge the rechargeable battery 12. When the rechargeable battery 12 is fully charged, the charger 16 is controlled to stop operating to stop charging the rechargeable battery 12.

Buck mode: when the voltage amplitude of the mains power is not less than the second threshold and less than a fourth threshold (for example, not less than 240 V but less than 280 V), that is, when the voltage of the mains power supplied by the AC input 111 is slightly high, the rechargeable battery 12 supplies power to the auxiliary power supply 121 so as to realize the AC startup of the online interactive uninterruptible power supply 1.

FIG. 4 is an equivalent circuit diagram of the online interactive uninterruptible power supply shown in FIG. 1 in a buck mode. As shown in FIG. 4, the control device controls the switch S11 to be turned on, controls the switch S16 of the automatic voltage regulator AVR1 to be turned on, so as to connect one terminal of a winding to a null line or neutral line, and controls the boost switch S14 and the buck switch S15 of the automatic voltage regulator AVR1 to connect moving contacts of the boost switch S14 and the buck switch S15 to the other terminal and a tap of the winding, respectively. In addition, the control device controls the changeover switch S12 to connect the automatic voltage regulator AVR1 to the switch S13 and the AC output 112, and controls the switch S13 to be turned on. Therefore, the automatic voltage regulator AVR1 automatically bucks the mains power from the AC input 111 and then transmits the mains power to the AC output 112. The control device simultaneously controls the DC-DC converter 13 and the full-bridge inverter 14 not to operate, and controls the charger 16 to operate to charge the rechargeable battery 12. When the rechargeable battery 12 is fully charged, the charger 16 is controlled to stop operating to stop charging the rechargeable battery 12.

Battery mode: when the voltage amplitude of the mains power is not greater than the third threshold or not less than the fourth threshold (for example, not greater than 160 V or not less than 280 V), that is, when the mains power is too high in voltage or is cut off, the rechargeable battery 12 supplies power to the auxiliary power supply 121 so as to realize the startup of the online interactive uninterruptible power supply 1.

FIG. 5 is an equivalent circuit diagram of the online interactive uninterruptible power supply shown in FIG. 1 in a battery mode. As shown in FIG. 5, the control device controls the switch S11 to be turned off, controls the switch S13 to be turned on, controls the changeover switch S12 to connect the AC output 112 to the output of the full-bridge inverter 14, controls the DC-DC converter 13 to operate to convert the DC power in the rechargeable battery 12 into pulsating DC power, and controls the inverter 15 to operate to convert the pulsating DC power into AC power to supply power to the load (not shown in FIG. 5) of the AC output 112. When the AC output 112 is unloaded (i.e., no load is connected), the control device controls the charger 16 to operate to recover peak power output by the DC-DC converter 13, so that the full-bridge inverter 14 outputs sinusoidal AC power.

To sum up, in the case where the online interactive uninterruptible power supply 1 is in the bypass mode, boost mode or buck mode, the auxiliary power supply 121 supplies the required DC voltage to the control device with the power supplied by the rechargeable battery 12, so as to realize the AC startup of the online interactive uninterruptible power supply 1.

If the online interactive uninterruptible power supply 1 shown in FIG. 1 is not connected with the rechargeable battery 12, when the AC input 111 is connected to the mains power, the auxiliary power supply 121 cannot supply the required DC voltage to the control device because there is no rechargeable battery to supply power, and the AC startup of the online interactive uninterruptible power supply 1 cannot be realized.

SUMMARY

In view of the above-mentioned technical problems in the existing technology, the present invention provides an online interactive uninterruptible power supply, including:

an automatic voltage regulator and a changeover switch which are sequentially connected between an AC input and an AC output;

a rectifying circuit, an input of the rectifying circuit being connected to the AC input;

a charger, an input of the charger being connected to an output of the rectifying circuit, and an output of the charger being configured for connection to a rechargeable battery;

a DC-DC converter, an input of the DC-DC converter being connected to the rechargeable battery; and a first inverter, an input of the first inverter being connected to an output of the DC-DC converter;

where the changeover switch is configured to controllably connect the AC output to one of the automatic voltage regulator and an output of the first inverter.

Preferably, the online interactive uninterruptible power supply includes a diode. A positive electrode of the diode is connected to a positive electrode output terminal of the DC-DC converter, a negative electrode of the diode is connected to a positive electrode input terminal of the charger, and a negative electrode output terminal of the DC-DC converter is connected to a negative electrode input terminal of the charger.

Preferably, the online interactive uninterruptible power supply includes a first switch connected between the AC input and the automatic voltage regulator, and an input of the rectifying circuit is connected between the AC input and the first switch.

Preferably, the first switch is a DC relay.

Preferably, the online interactive uninterruptible power supply includes a second switch connected to the input of the rectifying circuit, and the second switch is a normally closed switch.

Preferably, the online interactive uninterruptible power supply includes: a first electromagnetic interference filter connected between the AC input and the first switch; and/or a second electromagnetic interference filter connected between the changeover switch and the AC output; and/or a filtering circuit connected between the output of the rectifying circuit and an input of the charger.

Preferably, the DC-DC converter includes: a second inverter configured to convert DC power of the rechargeable battery into first AC power; a transformer including a primary side and a secondary side, the primary side being connected to an output of the second inverter and configured to boost the first AC power to second AC power; and a rectifying and filtering circuit, an input of the rectifying and filtering circuit being connected to the secondary side of the transformer and configured to rectify the second AC power into pulsating DC power.

Preferably, the first inverter is a full-bridge inverter configured to convert the pulsating DC power into third AC power.

Preferably, the full-bridge inverter includes four switch transistors having a switch frequency equal to the frequency of the mains power.

Preferably, the online interactive uninterruptible power supply includes a control device configured to: when the mains power at the AC input has a voltage amplitude greater than a first threshold and less than a second threshold, control the changeover switch to connect the AC output to the automatic voltage regulator, control the automatic voltage regulator to connect the first switch to the changeover switch by a conducting wire, control the charger to charge the rechargeable battery, and simultaneously control the DC-DC converter and the first inverter not to operate.

Alternatively, the control device is configured to: when the voltage amplitude of the mains power at the AC input is greater than a third threshold and not greater than the first threshold, control the changeover switch to connect the AC output to the automatic voltage regulator, control the automatic voltage regulator to boost the mains power at the AC input and then transmit the mains power to the changeover switch, control the charger to charge the rechargeable battery, and simultaneously control the DC-DC converter and the first inverter not to operate. Alternatively, the control device is configured to: when the voltage amplitude of the mains power at the AC input is not less than the second threshold and less than a fourth threshold, control the changeover switch to connect the AC output to the automatic voltage regulator, control the automatic voltage regulator to buck the mains power at the AC input and then transmit the mains power to the changeover switch, control the charger to charge the rechargeable battery, and simultaneously control the DC-DC converter and the first inverter not to operate. Alternatively, the control device is configured to: when the voltage amplitude of the mains power at the AC input is not greater than the third threshold or not less than the fourth threshold, control the changeover switch to connect the AC output to the output of the first inverter, control the DC-DC converter to convert DC power of the rechargeable battery into pulsating DC power, and control the first inverter to convert the pulsating DC power into third AC power.

Preferably, the online interactive uninterruptible power supply includes a diode. A positive electrode of the diode is connected to a positive electrode output terminal of the DC-DC converter, a negative electrode of the diode is connected to a positive electrode input terminal of the charger, and a negative electrode output terminal of the DC-DC converter is connected to a negative electrode input terminal of the charger. The control device is configured to further control the charger to operate to recover peak power output by the DC-DC converter when the voltage amplitude of the mains power at the AC input is not greater than the third threshold or not less than the fourth threshold and the AC output is unloaded.

Preferably, the online interactive uninterruptible power supply includes a first switch connected between the AC input and the automatic voltage regulator, and the input of the rectifying circuit is connected between the AC input and the first switch. The control device is configured to control the first switch to be turned on when the voltage amplitude of the mains power at the AC input is greater than the first threshold and less than the second threshold, or when the voltage amplitude of the mains power at the AC input is greater than the third threshold and not greater than the first threshold, or when the voltage amplitude of the mains power from the AC input is not less than the second threshold and less than the fourth threshold; and control the first switch to be turned off when the voltage amplitude of the mains power from the AC input is not greater than the third threshold or not less than the fourth threshold.

Preferably, the online interactive uninterruptible power supply includes a second switch connected to the input of the rectifying circuit. The second switch is a normally closed switch. The second switch is controlled to be turned off when the voltage amplitude of the mains power from the AC input is not greater than the third threshold or not less than the fourth threshold.

The present invention further provides a control method for the online interactive uninterruptible power supply. The method includes: detecting a voltage amplitude of mains power from the AC input; and when the voltage amplitude of the mains power is greater than a first threshold and less than a second threshold, controlling the changeover switch to connect the AC output to the automatic voltage regulator, controlling the automatic voltage regulator to connect the first switch to the changeover switch by a conducting wire, controlling the charger to charge the rechargeable battery, and simultaneously controlling the DC-DC converter and the first inverter not to operate; or when the voltage amplitude of the mains power is greater than a third threshold and not greater than the first threshold, controlling the changeover switch to connect the AC output to the automatic voltage regulator, controlling the automatic voltage regulator to boost the mains power from the AC input and then transmit the mains power to the changeover switch, controlling the charger to charge the rechargeable battery, and simultaneously controlling the DC-DC converter and the first inverter not to operate; or when the voltage amplitude of the mains power is not less than the second threshold and less than a fourth threshold, controlling the changeover switch to connect the AC output to the automatic voltage regulator, controlling the automatic voltage regulator to buck the mains power from the AC input and then transmit the mains power to the changeover switch, controlling the charger to charge the rechargeable battery, and simultaneously controlling the DC-DC converter and the first inverter not to operate; or when the voltage amplitude of the mains power is not greater than the third threshold or not less than the fourth threshold, controlling the changeover switch to connect the AC output to the output of the first inverter, controlling the DC-DC converter to convert DC power of the rechargeable battery into pulsating DC power, and controlling the first inverter to convert the pulsating DC power into third AC power.

Preferably, the online interactive uninterruptible power supply includes a diode. A positive electrode of the diode is connected to a positive electrode output terminal of the DC-DC converter, a negative electrode of the diode is connected to a positive electrode input terminal of the charger, and a negative electrode output terminal of the DC-DC converter is connected to a negative electrode input terminal of the charger. The control method further includes: controlling the charger to operate to recover peak power output by the DC-DC converter when the voltage amplitude of the mains power from the AC input is not greater than the third threshold or not less than the fourth threshold and the AC output is unloaded.

Preferably, the online interactive uninterruptible power supply includes a first switch connected between the AC input and the automatic voltage regulator, and the input of the rectifying circuit is connected between the AC input and the first switch. The control method further includes: controlling the first switch to be turned on when the voltage amplitude of the mains power from the AC input is greater than the first threshold and less than the second threshold, or when the voltage amplitude of the mains power from the AC input is greater than the third threshold and not greater than the first threshold, or when the voltage amplitude of the mains power from the AC input is not less than the second threshold and less than the fourth threshold; and controlling the first switch to be turned off when the voltage amplitude of the mains power from the AC input is not greater than the third threshold or not less than the fourth threshold.

Preferably, the online interactive uninterruptible power supply includes a second switch connected to the input of the rectifying circuit, the second switch being a normally closed switch. The control method further includes: controlling the second switch to be turned off when the voltage amplitude of the mains power from the AC input is not greater than the third threshold or not less than the fourth threshold.

The online interactive uninterruptible power supply of the present invention can realize battery-free AC startup, recover the peak power output by the DC-DC converter in the battery mode, reduce the voltage borne by the switch transistors of the inverter, thereby reducing costs. Besides, a low-voltage DC relay with small volume and low power consumption may be used as the first switch to reduce the costs and prevent mis-operation in ON or OFF state and generation of noise.

BRIEF DESCRIPTION OF DRAWINGS

Embodiments of the present invention will be further described below with reference to the accompanying drawings, in which.

DETAILED DESCRIPTION

In order to make the objects, technical schemes and advantages of the present invention clearer, the present invention will be further described in detail with reference to the drawings and specific embodiments.

Figure 1:
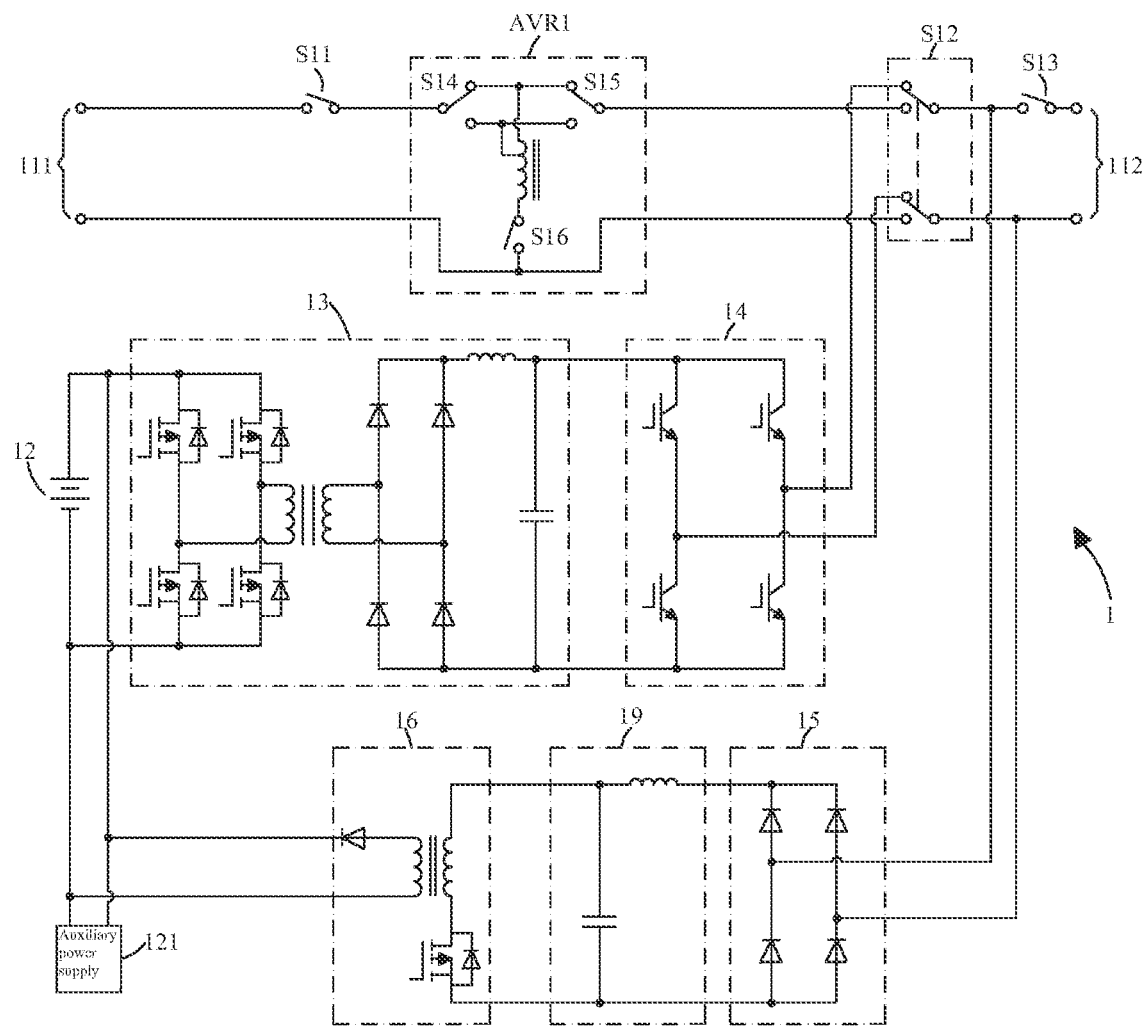
FIG. 1 is a circuit diagram of an online interactive uninterruptible power supply in the existing technology.
Figure 2:
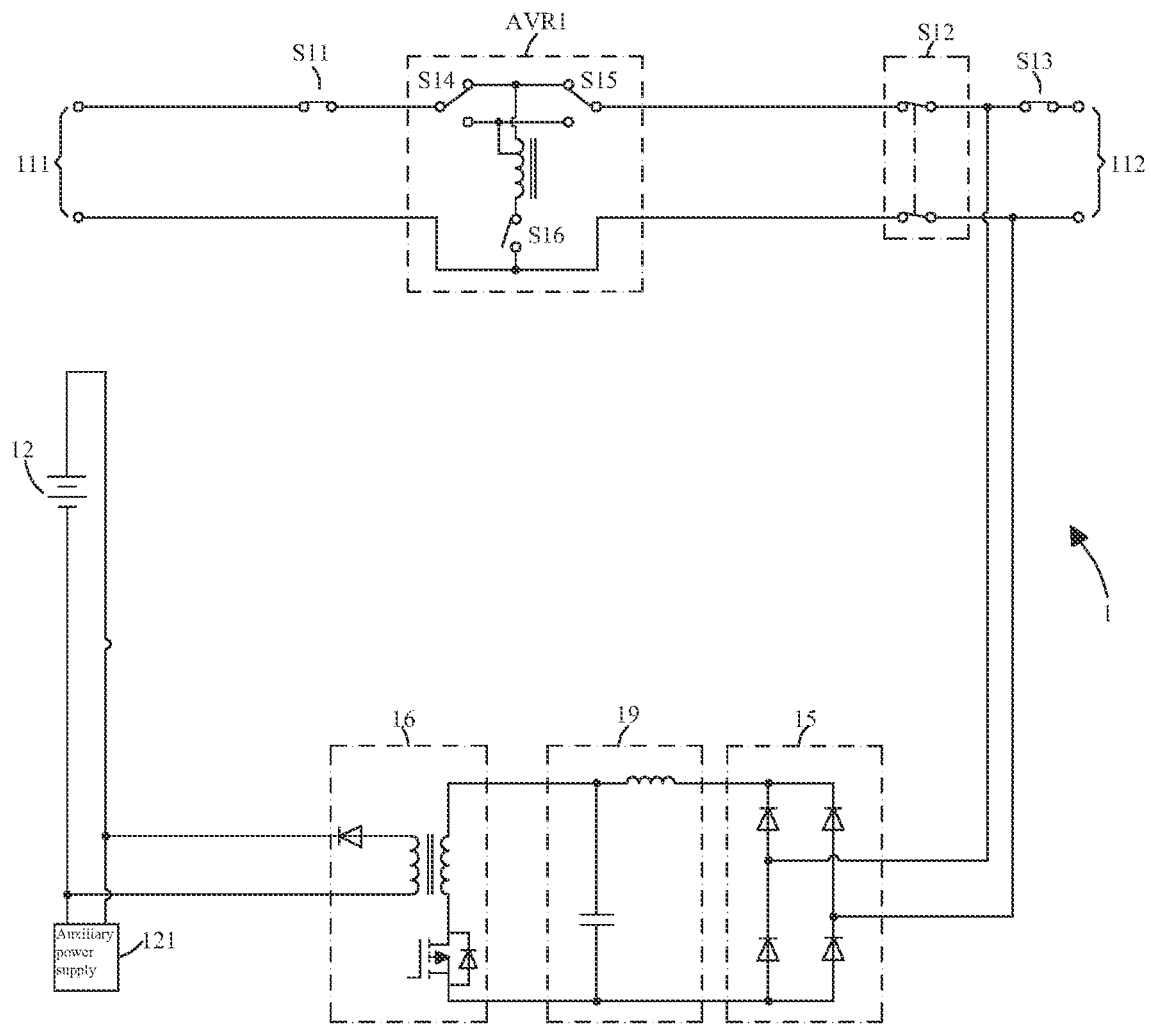
FIG. 2 is an equivalent circuit diagram of the online interactive uninterruptible power supply shown in FIG. 1 in a bypass mode.
Figure 3:
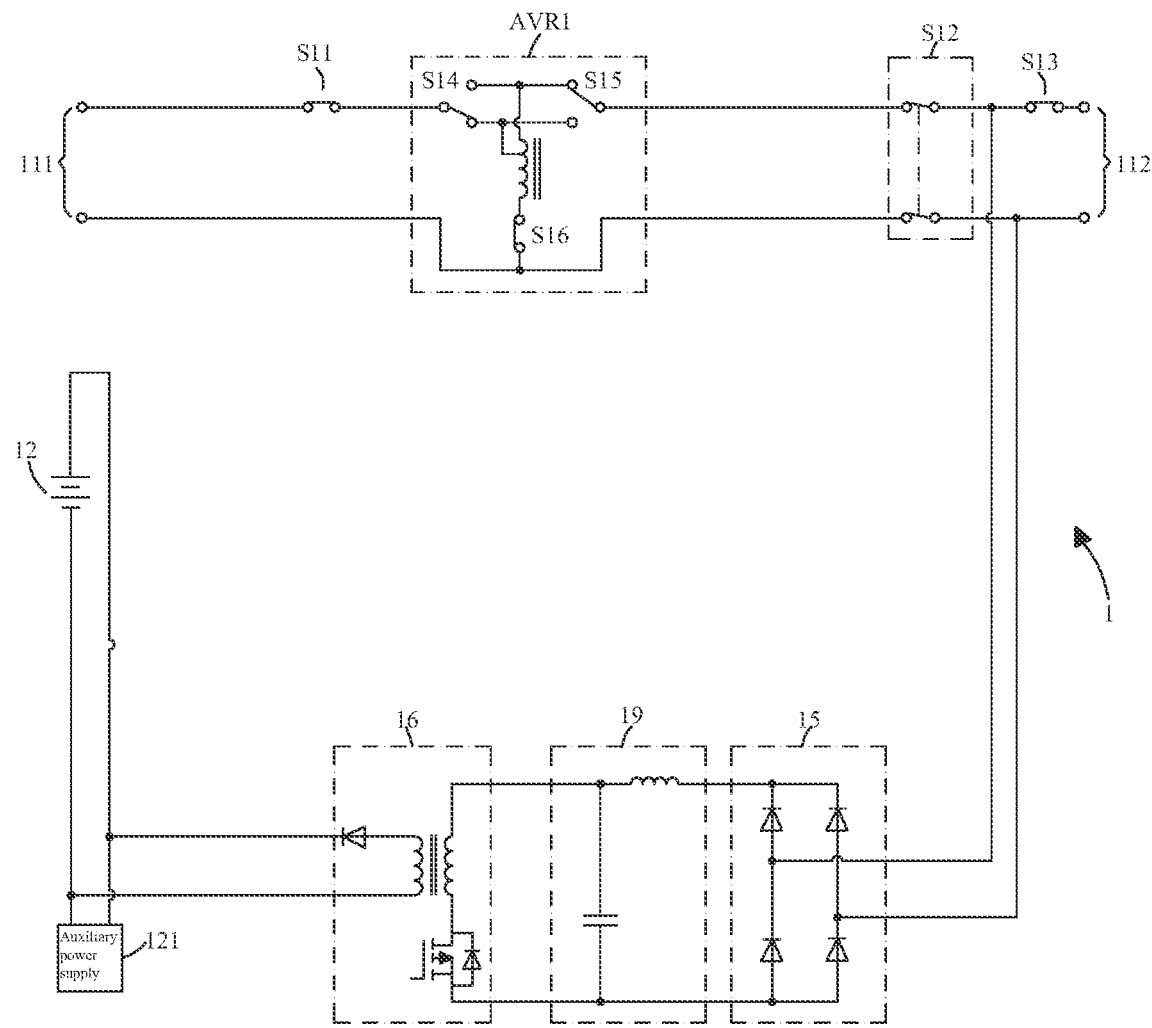
FIG. 3 is an equivalent circuit diagram of the online interactive uninterruptible power supply shown in FIG. 1 in a boost mode.
Figure 4:
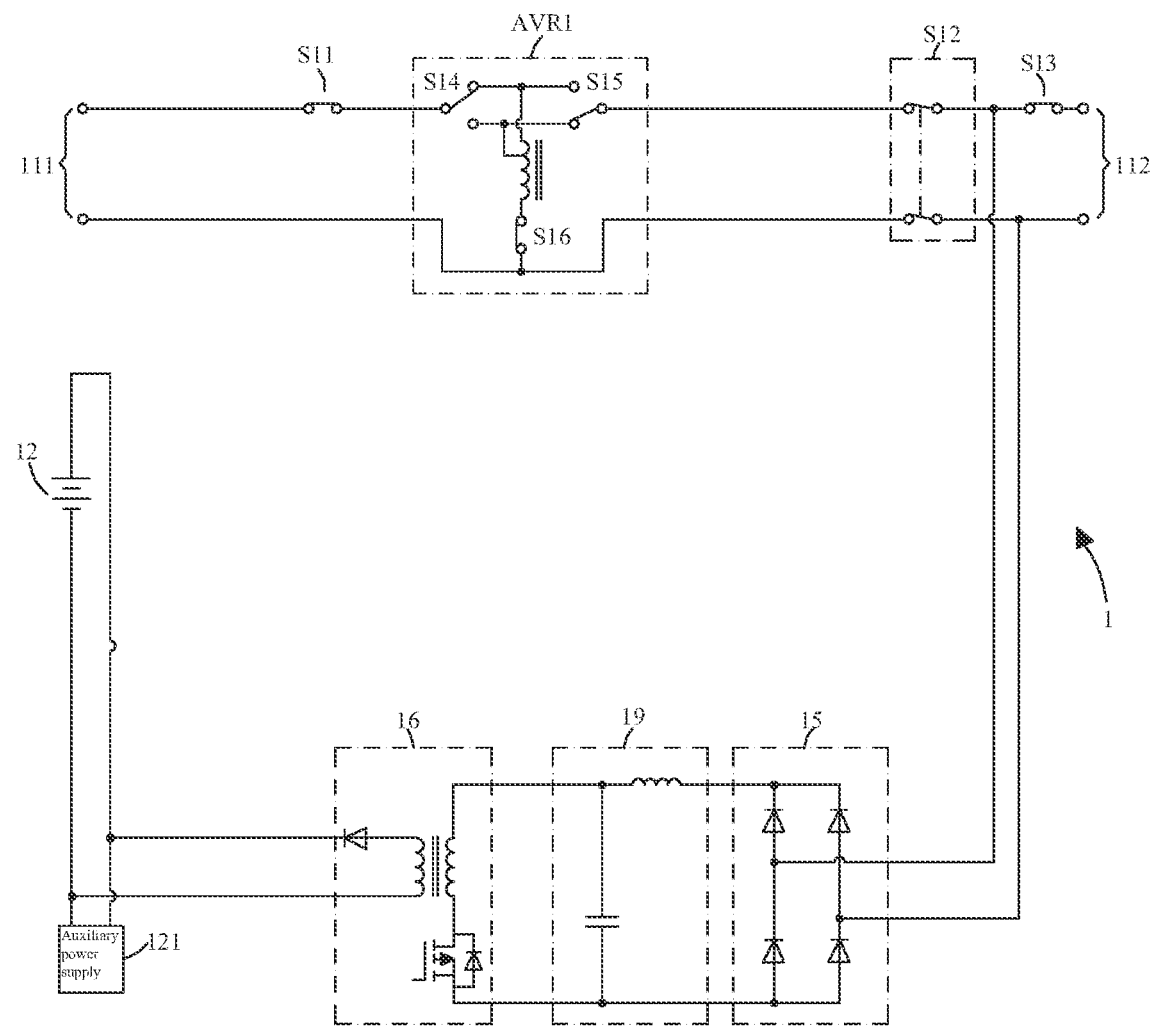
FIG. 4 is an equivalent circuit diagram of the online interactive uninterruptible power supply shown in FIG. 1 in a buck mode.
Figure 5:
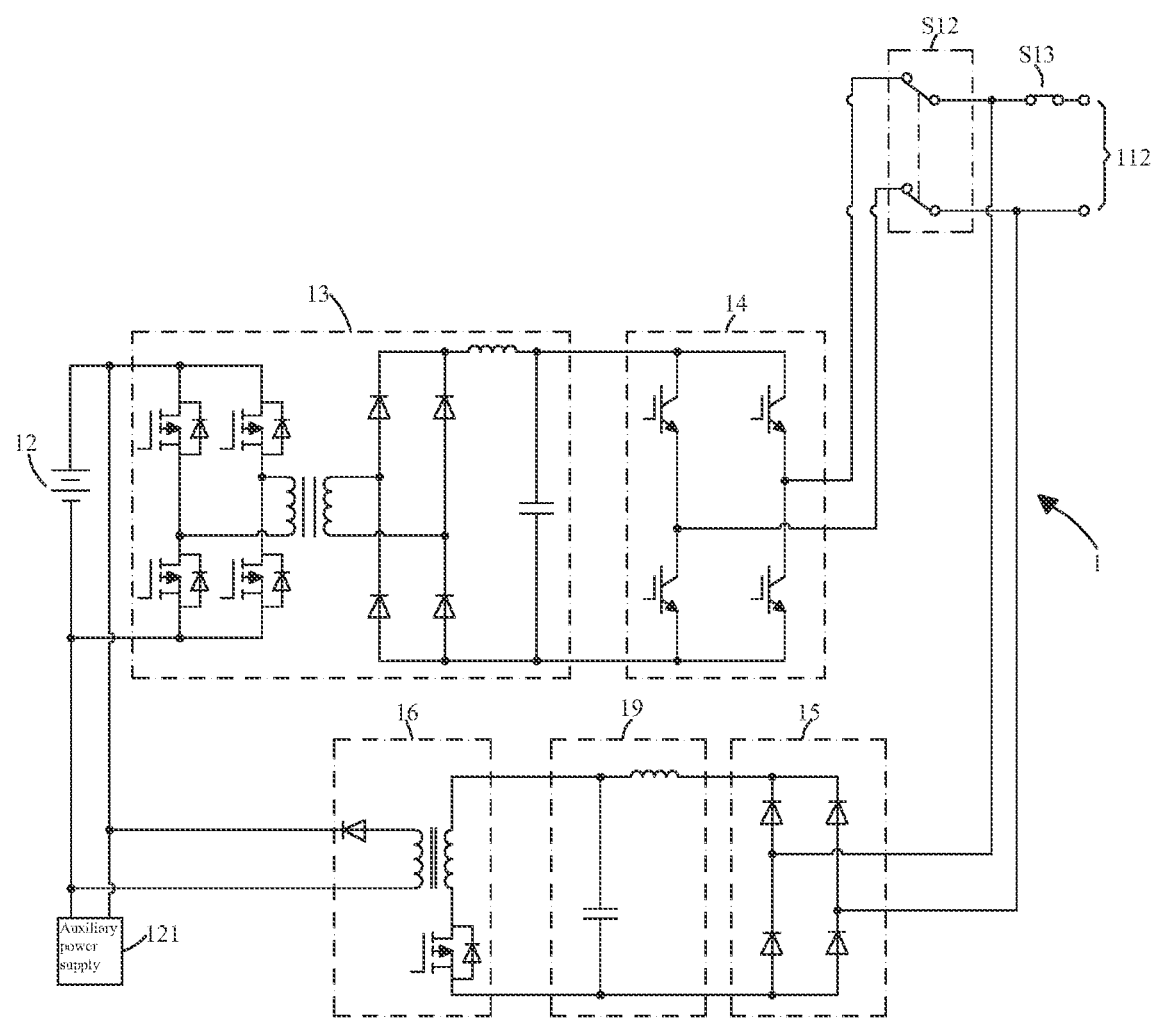
FIG. 5 is an equivalent circuit diagram of the online interactive uninterruptible power supply shown in FIG. 1 in a battery mode.
Figure 6:
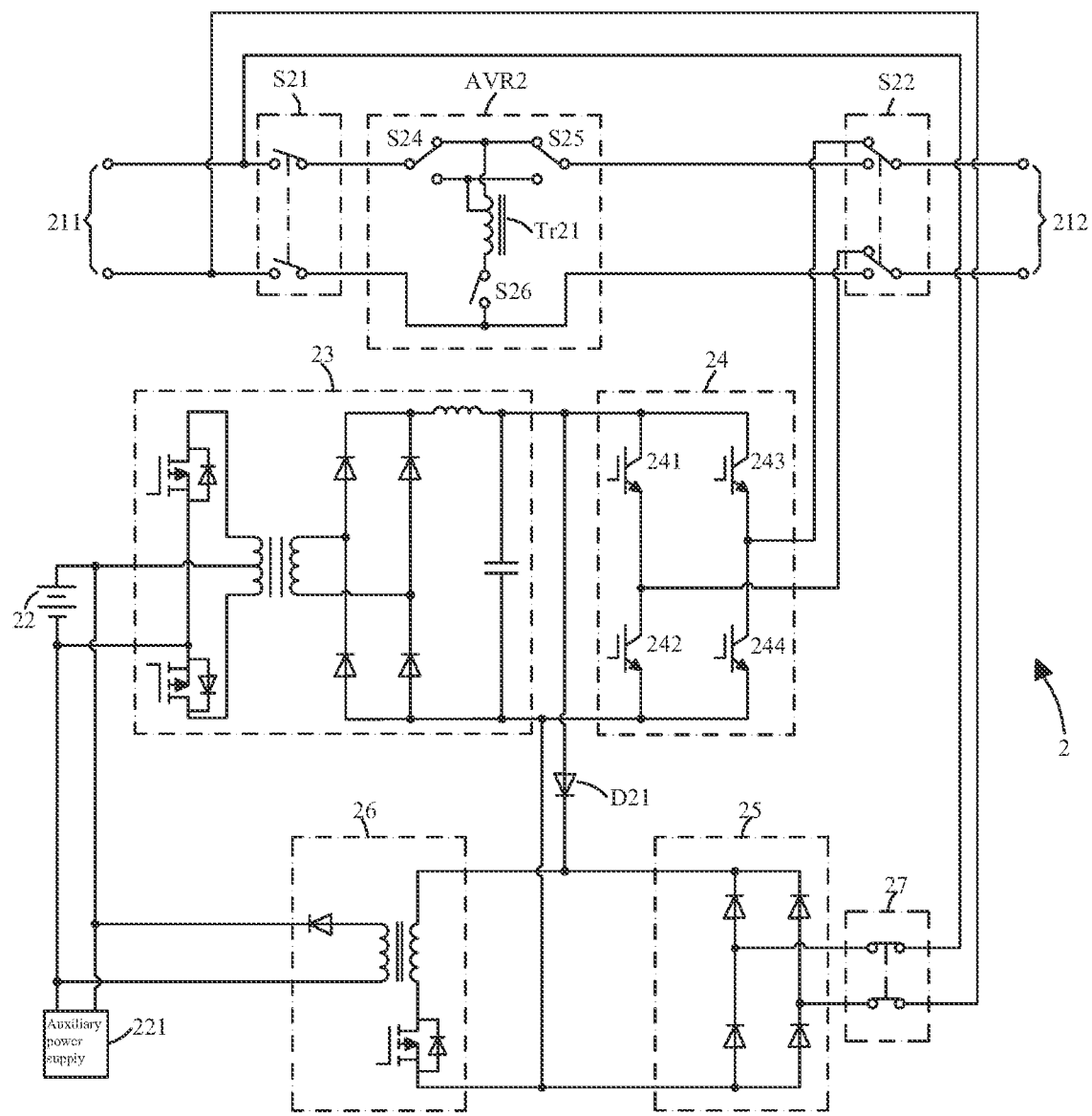
FIG. 6 is a circuit diagram of the online interactive uninterruptible power supply according to a first embodiment of the present invention.

FIG. 6 is a circuit diagram of the online interactive uninterruptible power supply according to a first embodiment of the present invention. As shown in FIG. 6, the online interactive uninterruptible power supply 2 includes a switch S21, an automatic voltage regulator AVR2 and a switch S22 which are sequentially connected between an AC input 211 and an AC output 212; a rechargeable battery 22, a DC-DC converter 23 and a full-bridge inverter 24 which are sequentially connected, where an input of the DC-DC converter 23 is connected to both ends of the rechargeable battery 22 and an output of the DC-DC converter is connected to an input of the full-bridge inverter 24, and the switch S22 controllably connect one of the automatic voltage regulator AVR2 and an output of the full-bridge inverter 24 to the AC output 212; a charger switch 27, a rectifying circuit 25 and a charger 26 which are sequentially connected, where the charger switch 27 is a normally closed switch and is connected between the AC input 211 and an input of the rectifying circuit 25, an output of the rectifying circuit 25 is connected to an input of the charger 26, and an output of the charger 26 is connected to both ends of the rechargeable battery 22 and configured to supply power to the auxiliary power supply 221; and a diode D21, where a positive electrode of the diode D21 is connected to a positive electrode output terminal of the DC-DC converter 23, a negative electrode of diode is connected to a positive electrode input terminal of the charger 26, and a negative electrode output terminal of the DC-DC converter 23 is connected to a negative electrode input terminal of the charger 26.

The automatic voltage regulator AVR2 includes an autotransformer Tr21, a boost switch S24, a buck switch S25 and a switch S26. One terminal of a winding of the autotransformer Tr21 is connected to a null line (or neutral line) by the switch S26. A moving contact of the boost switch S24 is controllably connected to one of the other terminal and a tap of the winding of the autotransformer. A moving contact of the buck switch S25 is controllably connected to one of the other terminal and the tap of the winding of the autotransformer.

The DC-DC converter 23 includes a push-pull inverter, a high-frequency transformer and a high-frequency rectifying and filtering circuit. An input of the push-pull inverter is connected to both ends of the rechargeable battery 22, an output of the push-pull inverter is connected to a primary side of the high-frequency transformer, and a secondary side of the high-frequency transformer is connected to an input of the high-frequency rectifying and filtering circuit. The push-pull inverter is configured to invert low-voltage DC power of the rechargeable battery 22 into high-frequency low-voltage AC power. The high-frequency transformer is configured to boost the high-frequency low-voltage AC power. The high-frequency rectifying and filtering circuit is configured for rectification and filtering to obtain DC power with boosted voltage.

The full-bridge inverter 24, the rectifying circuit 25 and the charger 26 may be selected from corresponding circuit modules in the existing technology, and specific circuit structures will not be described in detail here.

Similarly, those having ordinary skill in the art should know that, in order to simplify the online interactive uninterruptible power supply 2 shown in FIG. 6, the voltage detection device and control device are not shown.

Four operating modes, namely a bypass mode, a boost mode, a buck mode and a battery mode, of the online interactive uninterruptible power supply 2 will be discussed as follows according to the voltage amplitude of the mains power. In order to clearly illustrate the technical advantages of the present invention, it is assumed that the online interactive uninterruptible power supply 2 is not connected with the rechargeable battery 21 in the bypass mode, the boost mode and the buck mode, and the rechargeable battery 21 is shown by a dotted line in a corresponding equivalent circuit diagram.

Bypass mode: the voltage amplitude of the mains power is greater than a first threshold and less than a second threshold (for example, greater than 200 V and less than 240

V), that is, the AC input 211 supplies normal AC power allowed by a load. Assuming that the online interactive uninterruptible power supply 2 is not connected with the rechargeable battery 21, in the AC startup process, the AC input 211 is connected to the input of the rectifying circuit 25 through the turned-on charger switch 27, the rectifying circuit 25 supplies DC power to the charger 26, and the DC voltage output by the charger 26 is used to supply power to the auxiliary power supply 221, so that the auxiliary power supply 221 supplies the required DC voltage to the control device of the online interactive uninterruptible power supply 2.

Figure 7:
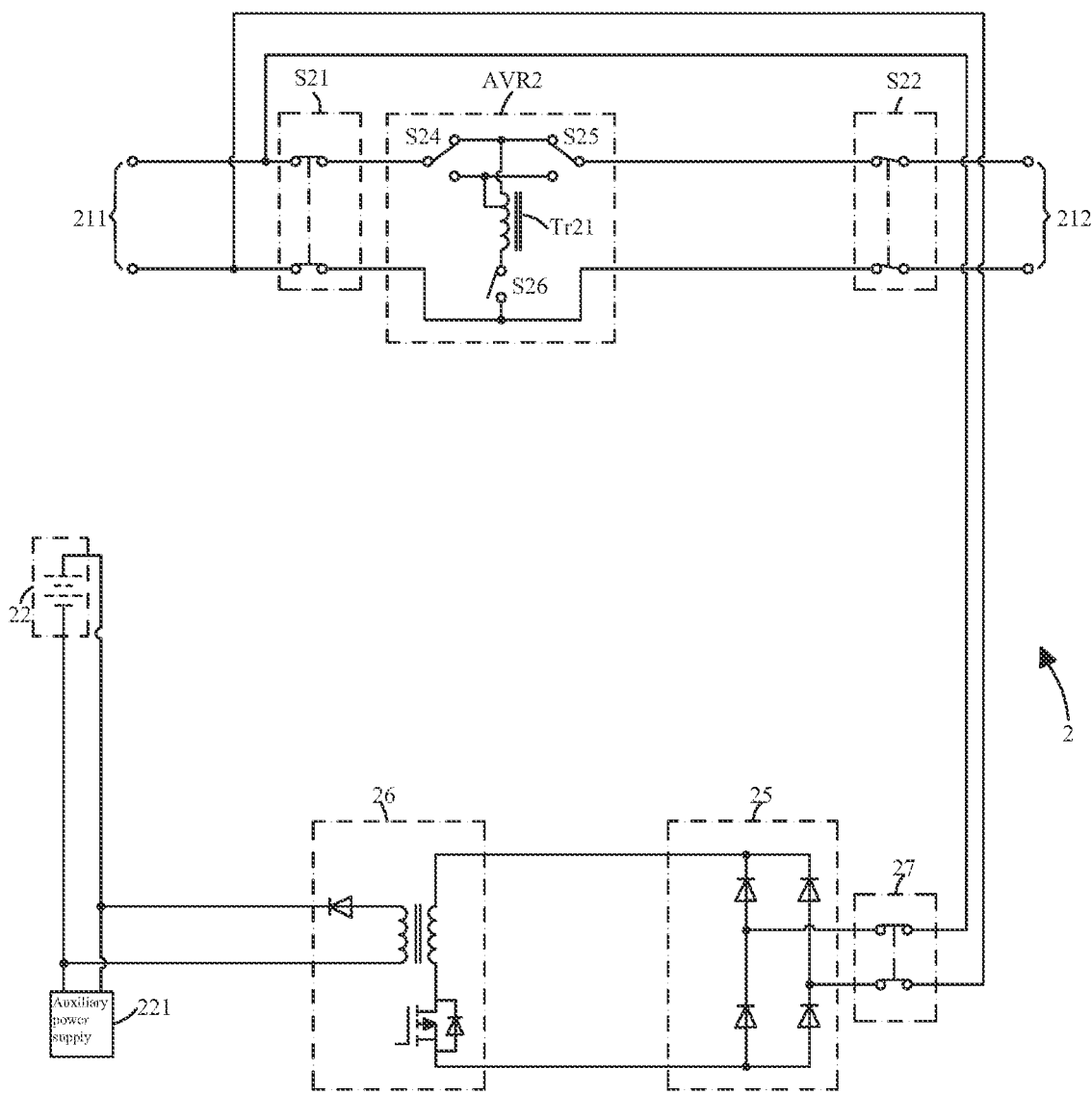
FIG. 7 is an equivalent circuit diagram of the online interactive uninterruptible power supply shown in FIG. 6 in the bypass mode.

FIG. 7 is an equivalent circuit diagram of the online interactive uninterruptible power supply shown in FIG. 6 in the bypass mode. As shown in FIG. 7, the control device controls the switch S21 to be turned on, controls the switch S26 of the automatic voltage regulator AVR2 to be turned off, controls the moving contacts of the boost switch S24 and the buck switch S25 to be connected by a conducting wire, and controls the changeover switch S22 to connect the automatic voltage regulator AVR2 to the AC output 212. Thus, the AC input 211 is connected to the AC output 212 by the turned-on switch and the conducting wire, and supplies the required AC power to the load. Therefore, the online interactive uninterruptible power supply realizes battery-free AC startup.

When the online interactive uninterruptible power supply 2 is connected with the rechargeable battery 22, the control device controls the charger 26 to operate to charge the rechargeable battery 22, until the rechargeable battery 22 is fully charged, controls the charger switch 27 to be in an OFF state, and control the charger 26 to stop operating.

Boost mode: the voltage amplitude of the mains power is greater than a third threshold and not greater than the first threshold (for example, greater than 160 V and not greater than 200 V), that is, the voltage of the mains power supplied by the AC input 211 is slightly low, and the establishment process of the auxiliary power supply 221 is the same as that in the bypass mode, which will not be repeated here.

Figure 8:
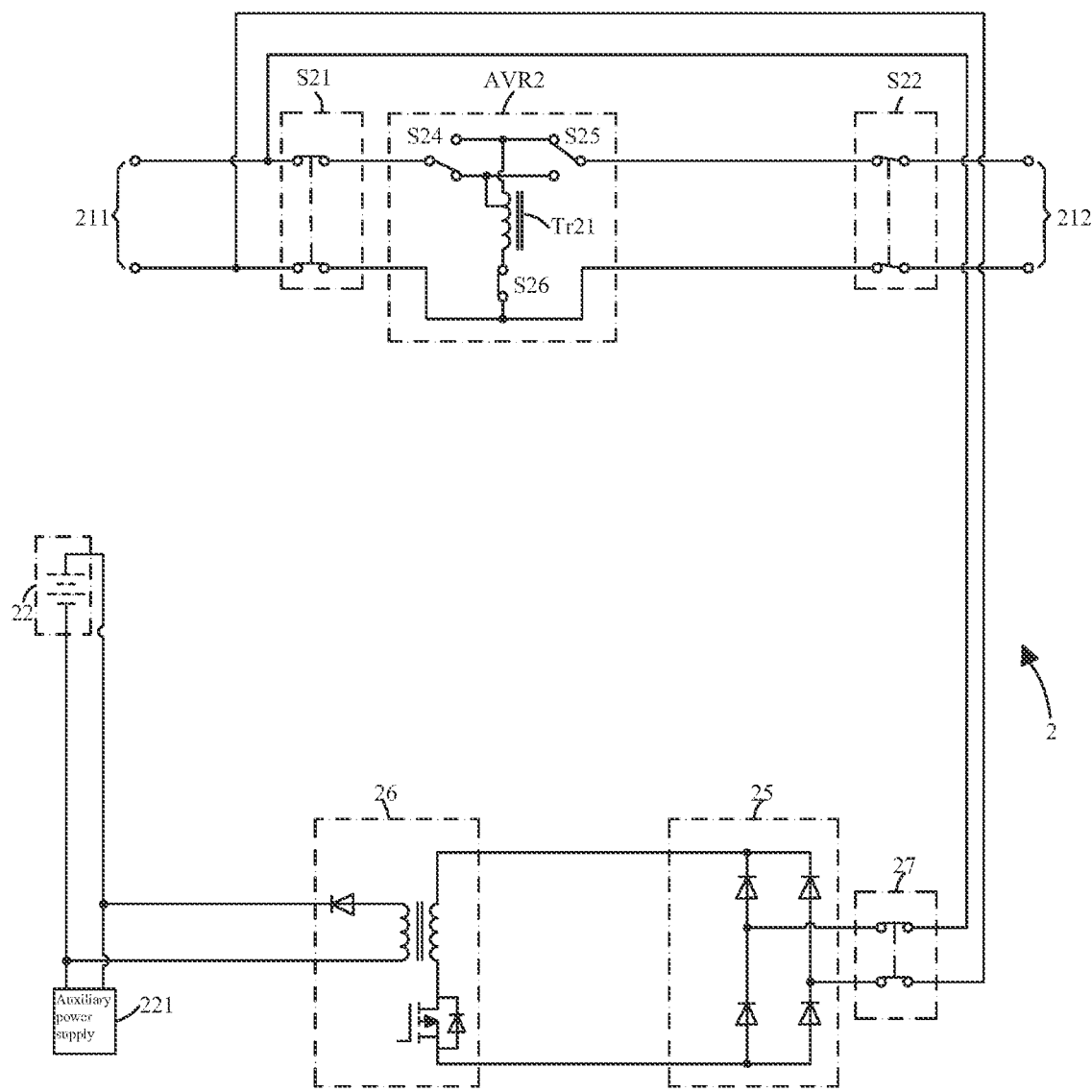
FIG. 8 is an equivalent circuit diagram of the online interactive uninterruptible power supply shown in FIG. 6 in the boost mode.

FIG. 8 is an equivalent circuit diagram of the online interactive uninterruptible power supply shown in FIG. 6 in the boost mode. The control device controls the switch S21 to be turned on, controls the switch S26 of the automatic voltage regulator AVR2 to be turned on, controls the boost switch S24 to connect the moving contact of the boost switch S24 to the tap of the winding of the autotransformer Tr21, controls the buck switch S25 to connect the moving contact of the buck switch S25 to the other terminal of the winding of the autotransformer Tr21; controls the changeover switch S22 to connect the automatic voltage regulator AVR2 to the AC output 212, and simultaneously controls the DC-DC converter 23 and the full-bridge inverter 24 to stop operating. When the online interactive uninterruptible power supply 2 is connected with the rechargeable battery 22, the control device further controls the charger 26 to operate to charge the rechargeable battery 22 using the mains power supplied by the AC input 211, until the rechargeable battery 22 is fully charged, controls the charger 26 to stop operating and controls the charger switch 27 to be turned off.

Buck mode: the voltage amplitude of the mains power is not less than the second threshold and less than a fourth threshold (for example, not less than 240 V and less than 280 V), that is, the voltage of the mains power supplied by the AC input 211 is slightly high, and the establishment process of the auxiliary power supply 221 is the same as that in the bypass mode, which will not be repeated here.

Figure 9:
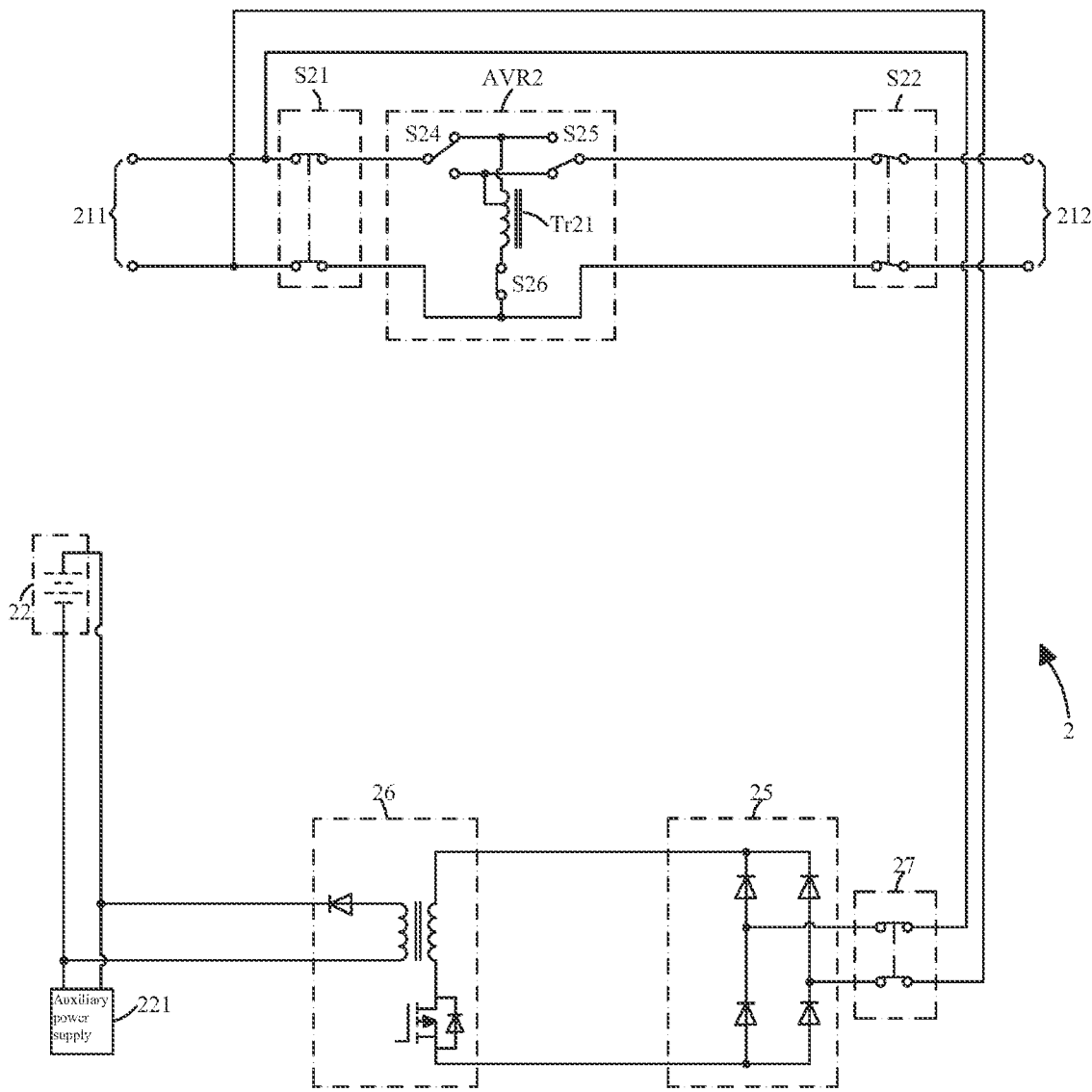
FIG. 9 is an equivalent circuit diagram of the online interactive uninterruptible power supply shown in FIG. 6 in the buck mode.

FIG. 9 is an equivalent circuit diagram of the online interactive uninterruptible power supply shown in FIG. 6 in the buck mode. As shown in FIG. 9, the control device controls the switch S21 to be turned on, controls the switch S26 of the automatic voltage regulator AVR2 to be turned on, controls the boost switch S24 to connect the moving contact of the boost switch S24 to the other terminal of the winding of the autotransformer Tr21, controls the buck switch S25 to connect the moving contact of the buck switch S25 to the tap of the winding of the autotransformer Tr21, controls the changeover switch S22 to connect the automatic voltage regulator AVR2 to the AC output 212, and simultaneously controls the DC-DC converter 23 and the full-bridge inverter 24 to stop operating. When the online interactive uninterruptible power supply 2 is connected with the rechargeable battery 22, the control device controls the charger 26 to operate to charge the rechargeable battery 22 using the mains power supplied by the AC input 211, until the rechargeable battery 22 is fully charged, controls the charger 26 to stop operating and controls the charger switch 27 to be turned off.

To sum up, when the online interactive uninterruptible power supply 2 is not connected with the rechargeable battery 22, AC startup can also be realized.

Battery mode: when the voltage amplitude of the mains power is not greater than the third threshold or not less than the fourth threshold (for example, not greater than 160 V or not less than 280 V), the rechargeable battery 22 is configured to supply power to the auxiliary power supply 221, whereby the auxiliary power supply 221 can supply the required DC voltage to the control device.

Figure 10:
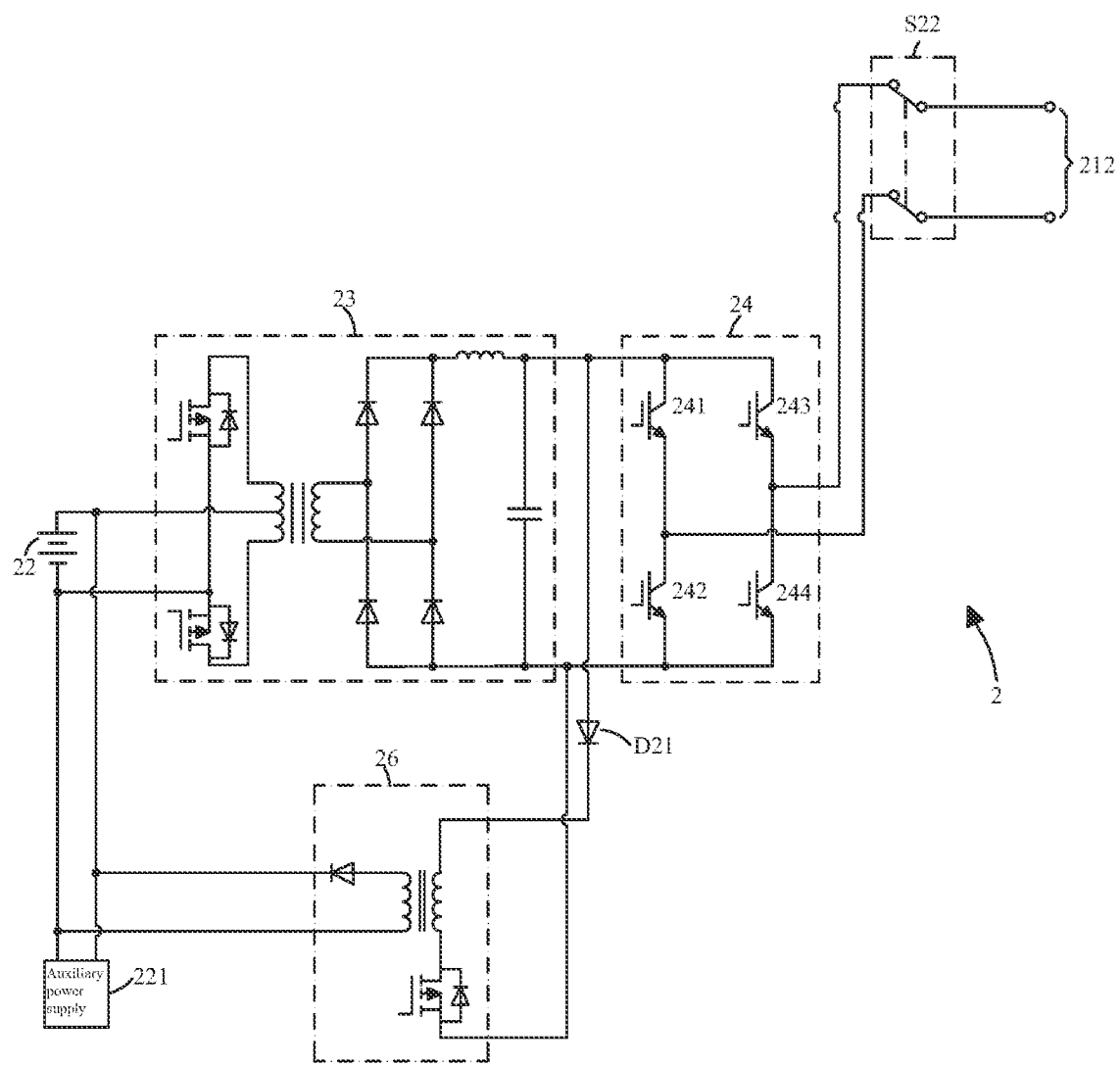
FIG. 10 is an equivalent circuit diagram of the online interactive uninterruptible power supply shown in FIG. 6 in the battery mode.

FIG. 10 is an equivalent circuit diagram of the online interactive uninterruptible power supply shown in FIG. 6 in the battery mode. As shown in FIG. 10, the control device controls the switch S21 to be turned off, controls the changeover switch S22 to connect the output of the full-bridge inverter 24 to the AC output 212, controls the charger switch 27 to be turned off, and controls the DC-DC converter 23 and the full-bridge inverter 24 to operate. The DC-DC converter 23 is configured to convert DC power of the rechargeable battery 22 into pulsating DC power, and the full-bridge inverter 24 is configured to convert the pulsating DC power into AC power and output the AC power to the AC output 212.

If the switch S21 is omitted from the online interactive uninterruptible power supply 2 (that is, replaced with a conducting wire), in the battery mode, the AC power from the AC output 212 may be bridged to the automatic voltage regulator AVR2 by the changeover switch S22 with a small contact gap, so that the AC input 211 is energized, causing electric shock when an operator touches the AC input 211. Therefore, the switch S21, as a safety switch or safety relay, is controlled to be turned off in the battery mode, and a relay with a large contact gap may be selected, so as to prevent the AC power from the AC output 212 from being bridged to the AC input 211.

In the battery mode, when the AC output 212 is unload (i.e., no load is connected), there is a need to recover the peak power output by the DC-DC converter 23 at this time. On the one hand, the rechargeable battery 22 is charged by the recovered energy, and on the other hand, a voltage waveform output by the full-bridge inverter 24 is modified into a sine wave. Since the output of the DC-DC converter 23 is connected to the input of the charger 26 by the diode D21, the control device provides a pulse width modulation signal to a power switch transistor (switch transistor for short) of the charger 26, to charge the rechargeable battery

22. In particular, in a 0-¼ cycle of mains power, the DC-DC converter 23 is controlled to operate to output a sinusoidal voltage with a phase angle of 0-90°; in an ¼-½ cycle of mains power, the charger 26 is controlled to operate to charge the rechargeable battery 22, and the DC-DC converter 23 is simultaneously made to output a sinusoidal voltage with a phase angle of 90-180°; in an ½-¾ cycle of mains power, the DC-DC converter 23 is controlled to operate to output a sinusoidal voltage with a phase angle of 0-90°; and in a ¾-1 cycle of mains power, the charger 26 is controlled to operate to charge the rechargeable battery 22, and the DC-DC converter 23 is simultaneously made to output a sinusoidal voltage with a phase angle of 90-180°. Finally, the DC-DC converter 23 outputs DC power with a steamed bread waveform, and the full-bridge inverter 24 outputs sinusoidal AC power.

Referring to FIG. 6 and FIG. 10, if the charger switch 27 is omitted from the online interactive uninterruptible power supply 2 (that is, replaced with a conducting wire), in the battery mode, the mains power from the AC input 211 may be transmitted to the input of the charger 26 through the rectifying circuit 25, so that pulsating DC power is obtained at the input of the charger 26. At this time, the DC power output by the DC-DC converter 23 may not be transmitted to the input of the charger 26 through the diode D21, so that the charger 26 cannot recover the peak power output by the DC-DC converter 23. Therefore, the charger switch 27 is controlled to be turned off in the battery mode, so that the DC power output by the DC-DC converter 23 can be transmitted to the input of the charger 26.

Referring to FIG. 10 again, in a positive half cycle of the AC power from the AC output 212, the switch transistor 243 and the switch transistor 242 of the full-bridge inverter 24 are controlled to be turned on, and in a negative half cycle, the switch transistor 241 and the switch transistor 244 are controlled to be turned on. During the transition from the positive half cycle to the negative half cycle, if the switch transistor 243 and switch transistor 242 are controlled to be turned off, the switch transistor 241 is controlled to be turned on, and the switch transistor 244 is controlled to be turned off, the voltage across the switch transistor 244 at this time is equal to the voltage at the AC output 212 plus the voltage at the output of the DC-DC converter 23. If the charger 26 is controlled to operate in the battery mode to recover the peak power output by the DC-DC converter 23, the voltage across the switch transistor 244 at this time is equal to the voltage at the AC output 212. If the charger 26 is controlled not to operate in the battery mode, the voltage across the switch transistor 244 is equal to twice the voltage at the AC output 212. Therefore, recovering the peak power output by the DC-DC converter 23 may reduce the voltage borne by the switch transistor 244 of the full-bridge inverter 24. Similarly, recovering the peak power output by the DC-DC converter 23 may also reduce the voltage borne by the switch transistors 241, 242 and 243. Thus, a switch transistor with half the voltage resistance may be selected as the full-bridge inverter 24 to reduce costs.

The online interactive uninterruptible power supply 2 of the present invention may realize battery-free AC startup. That is, without connecting with the rechargeable battery 22, the online interactive uninterruptible power supply 2 can realize AC startup in the bypass mode, the boost mode and the buck mode, and can recover the peak power output by the DC-DC converter 23 in the battery mode.

In addition, a small low-voltage DC relay may be selected as the switch S21 of the online interactive uninterruptible power supply 2, which has the following advantages as compared with an AC relay powered by the mains power: the DC relay is a conventional normally open switch and has a wide selection range; the auxiliary power supply 221 can supply stable low-voltage DC voltage to the DC relay, and no matter how the voltage amplitude of the mains power changes, the DC relay will not be misoperated in an ON/OFF state and will not produce noise; and the DC relay is small in size and low in power consumption.

The high-frequency transformer of the DC-DC converter 23 in the embodiment may be made of a high-frequency magnetic core material with small volume and light weight, thereby greatly increasing the power density of the circuit. In addition, a low-voltage rechargeable battery may be selected as the rechargeable battery 22, which greatly reduces the battery costs.

The full-bridge inverter 24 of the present invention is configured to convert pulsating DC power into AC power, so that a low-frequency full-bridge inverter may be selected as the full-bridge inverter 24, where four switch transistors of the full-bridge inverter 24 have a switch frequency equal to the frequency of the mains power, and the switch transistors with low switch frequency can significantly reduce device costs. Moreover, all the four switch transistors of the full-bridge inverter 24 may not have anti-parallel diodes, facilitating the selection of electronic components.

Those having ordinary skill in the art know that other values may be selected as the above-mentioned first threshold, second threshold, third threshold and fourth threshold according to the type of the load and the rated voltage value of the mains power.

Figure 11:
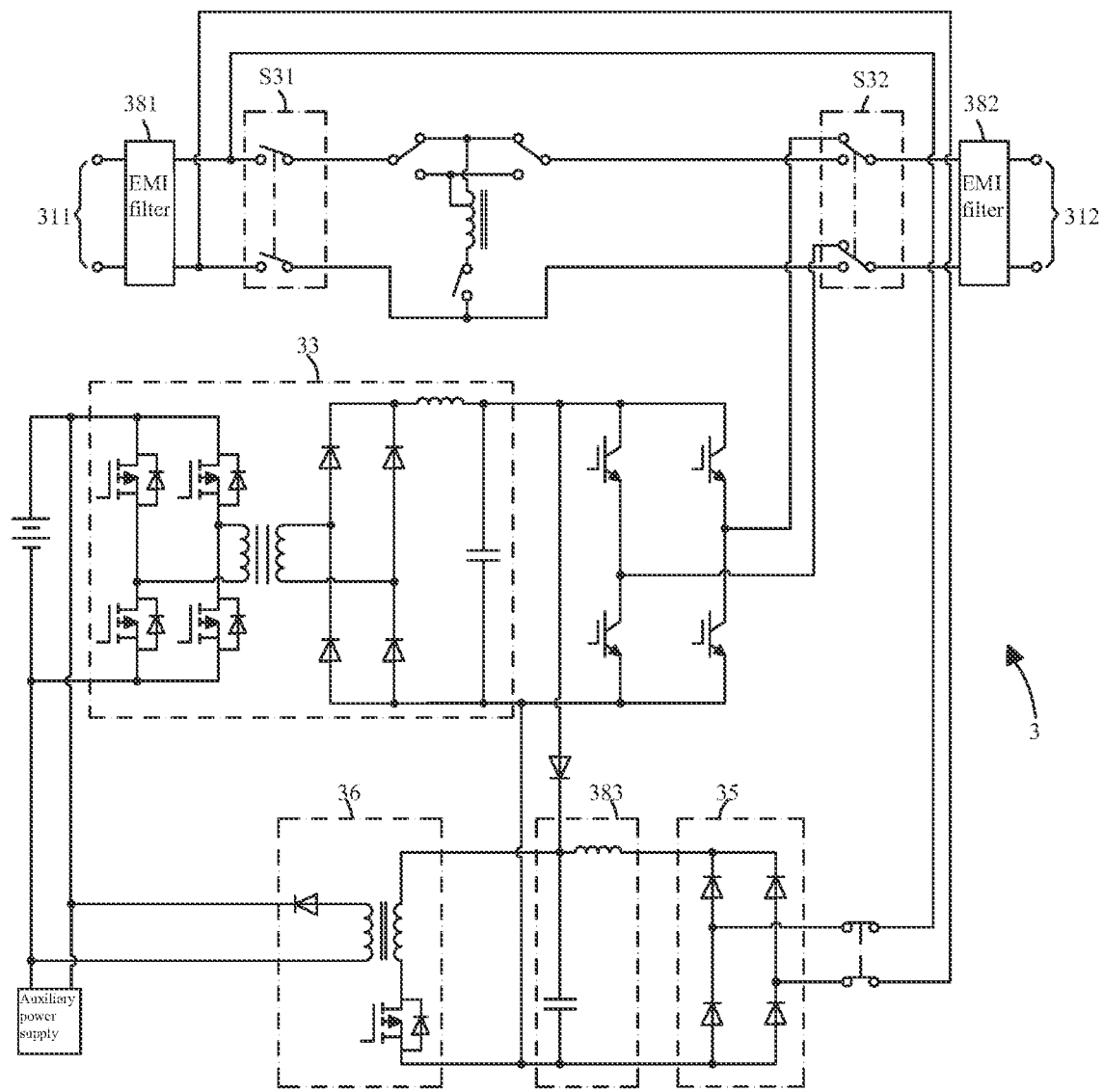
FIG. 11 is a circuit diagram of the online interactive uninterruptible power supply according to a second embodiment of the present invention.

FIG. 11 is a circuit diagram of a online interactive uninterruptible power supply according to a second embodiment of the present invention. As shown in FIG. 11, the online interactive uninterruptible power supply 3 is basically the same as the online interactive uninterruptible power supply 2 shown in FIG. 6, except that the online interactive uninterruptible power supply 3 further includes an electromagnetic interference (EMI) filter 381 connected between an AC input 311 and a switch S31, an EMI filter 382 connected between a changeover switch S32 and an AC output 312, and a filtering circuit 383 connected between an output of a rectifying circuit 35 and the input of the charger 26, and a DC-DC converter 33 includes a full-bridge inverter, a transformer and a rectifying and filtering circuit which are sequentially connected. The operating mode of the online interactive uninterruptible power supply 3 are the same as those of the online interactive uninterruptible power supply 2, which will not be repeated here.

The EMI filter 381, the EMI filter 382 and the filtering circuit 383 are configured to filter high-frequency signals to avoid interference caused by high-frequency noise signals, so that the online interactive uninterruptible power supply 3 has the ability to resist electromagnetic interference.

In other embodiments of the present invention, the push-pull inverter of the DC-DC converter 23 may be replaced by a full-bridge inverter or a half-bridge inverter, and a full-bridge inverter of the DC-DC converter 33 may be replaced by a half-bridge inverter or a push-pull inverter.

In other embodiments of the present invention, the full-bridge rectifying circuits of the DC-DC converters 23 and 33 are replaced with full-wave rectifying circuits.

In other embodiments of the present invention, when the rechargeable battery has higher battery voltage, the DC-DC converters 23 and 33 may be replaced with boost chopper circuits (or called Boost circuits), which are configured to directly boost the DC power of the rechargeable battery to the required bus voltage, and a full-bridge inverter or a half-bridge inverter may be selected as the inverter 24.

The rectifying circuits 25 and 35 in the above-mentioned embodiments of the present invention are not limited to full-bridge rectifying circuits, and may also be other rectifying circuits such as half-wave rectifying circuits or full-wave rectifying circuits, so as to rectify the AC power from the AC input into DC power and output the AC power to the inputs of the chargers 26 and 36.

The chargers 26 and 36 of the present invention are respectively configured to convert the DC power output by the rectifying circuits 25 and 35 into DC power and to charge the rechargeable battery. The chargers 26 and 36 are not limited to flyback chargers, and may be other types of chargers for converting the DC power output by the rectifying circuits into DC power.

The automatic voltage regulator of the present invention may also be selected from automatic voltage regulators with other connection structures and boost and buck ratios in the existing technology.

Although the present invention has been described in terms of the preferred embodiments, the present invention is not limited to the embodiments described herein, and various variations and changes can be made without departing from the scope of the present invention.

The invention claimed is:

1. An online interactive uninterruptible power supply, comprising:
   an automatic voltage regulator and a changeover switch sequentially connected between an AC input and an AC output;
   a rectifying circuit having an input connected to the AC input;
   a charger having an input connected to an output of the rectifying circuit and an output configured for connection to a rechargeable battery;
   a DC-DC converter having an input configured for connection to the rechargeable battery and a negative electrode output terminal connected to a negative electrode input terminal of the charger;
   a diode having a positive electrode connected to a positive electrode output terminal of the DC-DC converter and a negative electrode connected to a positive electrode input terminal of the charger; and
   a first inverter having an input connected to an output of the DC-DC converter,
   wherein the changeover switch is configured to controllably connect the AC output to one of the automatic voltage regulator and an output of the first inverter,
   wherein the online interactive uninterruptible power supply is configured to control the charger to operate to recover peak power output by the DC-DC converter when a voltage amplitude of a mains power from the AC input is not greater than a first threshold or not less than a second threshold and the AC output is unloaded.

2. The online interactive uninterruptible power supply of claim 1, further comprising a first switch connected between the AC input and the automatic voltage regulator, and the input of the rectifying circuit is connected between the AC input and the first switch.

3. The online interactive uninterruptible power supply of claim 2, wherein the first switch is a DC relay.

4. The online interactive uninterruptible power supply of claim 1, further comprising a second switch connected to the input of the rectifying circuit, the second switch being a normally closed switch.

5. The online interactive uninterruptible power supply of claim 2, further comprising:
   a first electromagnetic interference filter connected between the AC input and the first switch; and/or
   a second electromagnetic interference filter connected between the changeover switch and the AC output; and/or
   a filtering circuit connected between the output of the rectifying circuit and the input of the charger.

6. The online interactive uninterruptible power supply of claim 1, wherein the DC-DC converter comprises:
   a second inverter configured to convert DC power of the rechargeable battery into first AC power;
   a transformer including a primary side and a secondary side, the primary side being connected to an output of the second inverter and configured to boost the first AC power to second AC power; and
   a rectifying and filtering circuit, an input of the rectifying and filtering circuit being connected to the secondary side of the transformer and configured to rectify the second AC power into pulsating DC power.

7. The online interactive uninterruptible power supply of claim 6, wherein the first inverter is a full-bridge inverter configured to convert the pulsating DC power into third AC power.

8. The online interactive uninterruptible power supply of claim 7, wherein the full-bridge inverter comprises four switch transistors having a switch frequency equal to a frequency of the mains power.

9. The online interactive uninterruptible power supply of claim 2, further comprising a control device configured to:
   when the mains power from the AC input has the voltage amplitude greater than a third threshold and less than a fourth threshold, control the changeover switch to connect the AC output to the automatic voltage regulator, control the automatic voltage regulator to connect the first switch to the changeover switch by a conducting wire, control the charger to charge the rechargeable battery, and simultaneously control the DC-DC converter and the first inverter not to operate; or
   when the voltage amplitude of the mains power from the AC input is greater than the first threshold and not greater than the third threshold, control the changeover switch to connect the AC output to the automatic voltage regulator, control the automatic voltage regulator to boost the mains power from the AC input and then transmit the mains power to the changeover switch, control the charger to charge the rechargeable battery, and simultaneously control the DC-DC converter and the first inverter not to operate; or
   when the voltage amplitude of the mains power from the AC input is not less than the fourth threshold and less than the second threshold, control the changeover switch to connect the AC output to the automatic voltage regulator, control the automatic voltage regulator to buck the mains power from the AC input and then transmit the mains power to the changeover switch, control the charger to charge the rechargeable battery, and simultaneously control the DC-DC converter and the first inverter not to operate; or
   when the voltage amplitude of the mains power from the AC input is not greater than the first threshold or not less than the second threshold, control the changeover switch to connect the AC output to the output of the first inverter, control the DC-DC converter to convert a DC power of the rechargeable battery into pulsating DC power, and control the first inverter to convert the pulsating DC power into third AC power.

10. The online interactive uninterruptible power supply of claim 9, further comprising a first switch connected between the AC input and the automatic voltage regulator, wherein an input of the rectifying circuit is connected between the AC input and the first switch; and the control device is configured to:
control the first switch to be turned on when the voltage amplitude of the mains power from the AC input is greater than the third threshold and less than the fourth threshold, or when the voltage amplitude of the mains power from the AC input is greater than the first threshold and not greater than the third threshold, or when the voltage amplitude of the mains power from the AC input is not less than the fourth threshold and less than the second threshold; and
control the first switch to be turned off when the voltage amplitude of the mains power from the AC input is not greater than the first threshold or not less than the second threshold.

11. The online interactive uninterruptible power supply of claim 9, further comprising a second switch connected to the input of the rectifying circuit, wherein the second switch is a normally closed switch and the second switch is controlled to be turned off when the voltage amplitude of the mains power from the AC input is not greater than the first threshold or not less than the second threshold.

12. A control method for an online interactive uninterruptible power supply comprising an automatic voltage regulator and a changeover switch sequentially connected between an AC input and an AC output, a rectifying circuit having an input connected to the AC input, a charger having an input connected to an output of the rectifying circuit and an output connected to a rechargeable battery, a DC-DC converter having an input connected to the rechargeable battery and a negative electrode output terminal connected to a negative electrode input terminal of the charger, a diode having a positive electrode connected to a positive electrode output terminal of the DC-DC converter and a negative electrode connected to a positive electrode input terminal of the charger, and a first inverter having an input connected to an output of the DC-DC converter, the method comprising:
detecting voltage amplitude of mains power from the AC input;
when the voltage amplitude of the mains power is greater than a first threshold and less than a second threshold, controlling the changeover switch to connect the AC output to the automatic voltage regulator, controlling the automatic voltage regulator to connect a first switch to the changeover switch by a conducting wire, controlling the charger to charge the rechargeable battery, and simultaneously controlling the DC-DC converter and the first inverter not to operate; or
when the voltage amplitude of the mains power is greater than a third threshold and not greater than the first threshold, controlling the changeover switch to connect the AC output to the automatic voltage regulator, controlling the automatic voltage regulator to boost the mains power from the AC input and then transmit the mains power to the changeover switch, controlling the charger to charge the rechargeable battery, and simultaneously controlling the DC-DC converter and the first inverter not to operate; or
when the voltage amplitude of the mains power is not less than the second threshold and less than a fourth threshold, controlling the changeover switch to connect the AC output to the automatic voltage regulator, controlling the automatic voltage regulator to buck the mains power from the AC input and then transmit the mains power to the changeover switch, controlling the charger to charge the rechargeable battery, and simultaneously controlling the DC-DC converter and the first inverter not to operate; or
when the voltage amplitude of the mains power is not greater than the third threshold or not less than the fourth threshold, controlling the changeover switch to connect the AC output to the output of the first inverter, controlling the DC-DC converter to convert DC power of the rechargeable battery into pulsating DC power, and controlling the first inverter to convert the pulsating DC power into third AC power, and
controlling the charger to operate to recover peak power output by the DC-DC converter when the voltage amplitude of the mains power from the AC input is not greater than the third threshold or not less than the fourth threshold and the AC output is unloaded.

13. The control method of claim 12, wherein the online interactive uninterruptible power supply comprises a first switch connected between the AC input and the automatic voltage regulator, and the input of the rectifying circuit is connected between the AC input and the first switch; and the control method further comprises:
controlling the first switch to be turned on when the voltage amplitude of the mains power from the AC input is greater than the first threshold and less than the second threshold, or when the voltage amplitude of the mains power from the AC input is greater than the third threshold and not greater than the first threshold, or when the voltage amplitude of the mains power from the AC input is not less than the second threshold and less than the fourth threshold; and
controlling the first switch to be turned off when the voltage amplitude of the mains power from the AC input is not greater than the third threshold or not less than the fourth threshold.

14. The control method of claim 12, wherein the online interactive uninterruptible power supply comprises a second switch connected to the input of the rectifying circuit, the second switch being a normally closed switch; and the control method further comprises: controlling the second switch to be turned off when the voltage amplitude of the mains power from the AC input is not greater than the third threshold or not less than the fourth threshold.

* * * * *